US009172774B2

(12) United States Patent
Musta et al.

(10) Patent No.: US 9,172,774 B2
(45) Date of Patent: Oct. 27, 2015

(54) TECHNIQUE FOR MANAGING COMMUNICATIONS AT A ROUTER

(75) Inventors: Charles A. Musta, Austin, TX (US); Wayne Dunlap, Austin, TX (US); Ben Menchaca, Pflugerville, TX (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 13/086,000

(22) Filed: Apr. 13, 2011

(65) Prior Publication Data
US 2012/0265852 A1    Oct. 18, 2012

(51) Int. Cl.
G06F 15/16 (2006.01)
H04L 29/06 (2006.01)
H04L 12/781 (2013.01)

(52) U.S. Cl.
CPC ............... *H04L 69/16* (2013.01); *H04L 45/52* (2013.01); *H04L 69/08* (2013.01)

(58) Field of Classification Search
USPC ........................................ 709/218, 246, 230
See application file for complete search history.

(56) References Cited

U.S. PATENT DOCUMENTS

| 5,619,650 | A | | 4/1997 | Bach et al. | |
|---|---|---|---|---|---|
| 6,128,654 | A | * | 10/2000 | Runaldue et al. | 709/219 |
| 6,317,854 | B1 | * | 11/2001 | Watanabe | 714/749 |
| 6,625,169 | B1 | * | 9/2003 | Tofano | 370/466 |
| 6,714,978 | B1 | * | 3/2004 | Porter | 709/224 |
| 2002/0052968 | A1 | * | 5/2002 | Bonefas et al. | 709/231 |
| 2004/0049594 | A1 | * | 3/2004 | Song et al. | 709/238 |
| 2005/0060427 | A1 | | 3/2005 | Phillips et al. | |
| 2007/0153782 | A1 | | 7/2007 | Fletcher et al. | |
| 2008/0198781 | A1 | | 8/2008 | Rajakarunanayake et al. | |
| 2008/0313449 | A1 | * | 12/2008 | Zimmer et al. | 713/1 |

OTHER PUBLICATIONS

"International Search Report and Written Opinion—PCT/US2012/033689—ISA/EPO—Sep. 19, 2012".
Partial International Search Report—PCT/US2012/033689—ISA/EPO—Jul. 17, 2012.

* cited by examiner

*Primary Examiner* — Brian J Gillis
*Assistant Examiner* — Thao Duong
(74) *Attorney, Agent, or Firm* — DeLizio Law, PLLC

(57) ABSTRACT

A router can process the data received from the local area network at a network protocol stack local to the router, while processing data received from the wide area network normally. The offloading of the stack processing from the source of the data to the router reduces the number of network hops that both packets based on the received data, and acknowledgements from the destination of the packets, must travel, thereby reducing communication latency. In addition, offloading the stack processing to the router can reduce the processing load at the data source. Further, the router can implement different quality of service or other processing protocols for the local area and wide area traffic.

22 Claims, 6 Drawing Sheets

TECHNIQUE FOR MANAGING COMMUNICATIONS AT A ROUTER

BACKGROUND

1. Field of the Disclosure

The present disclosure relates to computer networks and more particularly to routing devices for a computer network.

2. Description of the Related Art

Computers increasingly communicate with other computers via a communication network. The network allows a computer to provide a variety of services that cannot be performed by the computer individually. For example, a collection of computers can allow users to participate in an online game, where users compete in a common game environment shared between the computers. However, as the amount of information communicated by a computer to a communication network increases, the computer resources can become stressed, causing undesirable delays in information transfer. This can result in a poor user experience. For example, the user can experience network lag, where information transferred by the network is not processed by the computer with sufficient speed, such that the user is able to perceive the delay in the information transfer. Further, network lag and other network transfer problems can impact a wide variety of applications, such as gaming applications, voice communication applications, and the like.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate techniques for improving communication efficiency of a communication network by configuring a router to process data received from a local area network coupled to the network differently from data received from a wide area network connected to the network. In particular, the router can process the data received from the local area network at a network protocol stack local to the router, while processing data received from the wide area network normally. The offloading of the stack processing from the source of the data to the router reduces the number of network hops that both packets based on the received data, and acknowledgements from the destination of the packets, must travel, thereby reducing communication latency. In addition, offloading the stack processing to the router can reduce the processing load at the data source. Further, the router can implement different quality of service or other processing protocols for the local area and wide area traffic. For example, the router can take advantage of the relatively low latency in connection with the local area network to by communicating multiple copies of data to a destination at the local area network, thereby reducing or obviating the need for the destination to send acknowledgements and thus reducing latency.

As used herein, a network protocol stack refers to a set of functions that transforms raw data provided by one or more computer applications into transportable data. Transportable data and transportable packets refer to data that can be communicated via a wide area network. A network protocol stack converts the raw data into a format that is suitable for transmission via the routers and other switching devices of the computer network. For example, raw data can be provided by an application in a rudimentary packetized form via a data stream. The network protocol stack extracts the raw data from the data stream, formats the raw data into one or more transportable packets, and appends any header or other information to the transportable packets, and provides the transportable packets to the network for communication.

Figure 1:
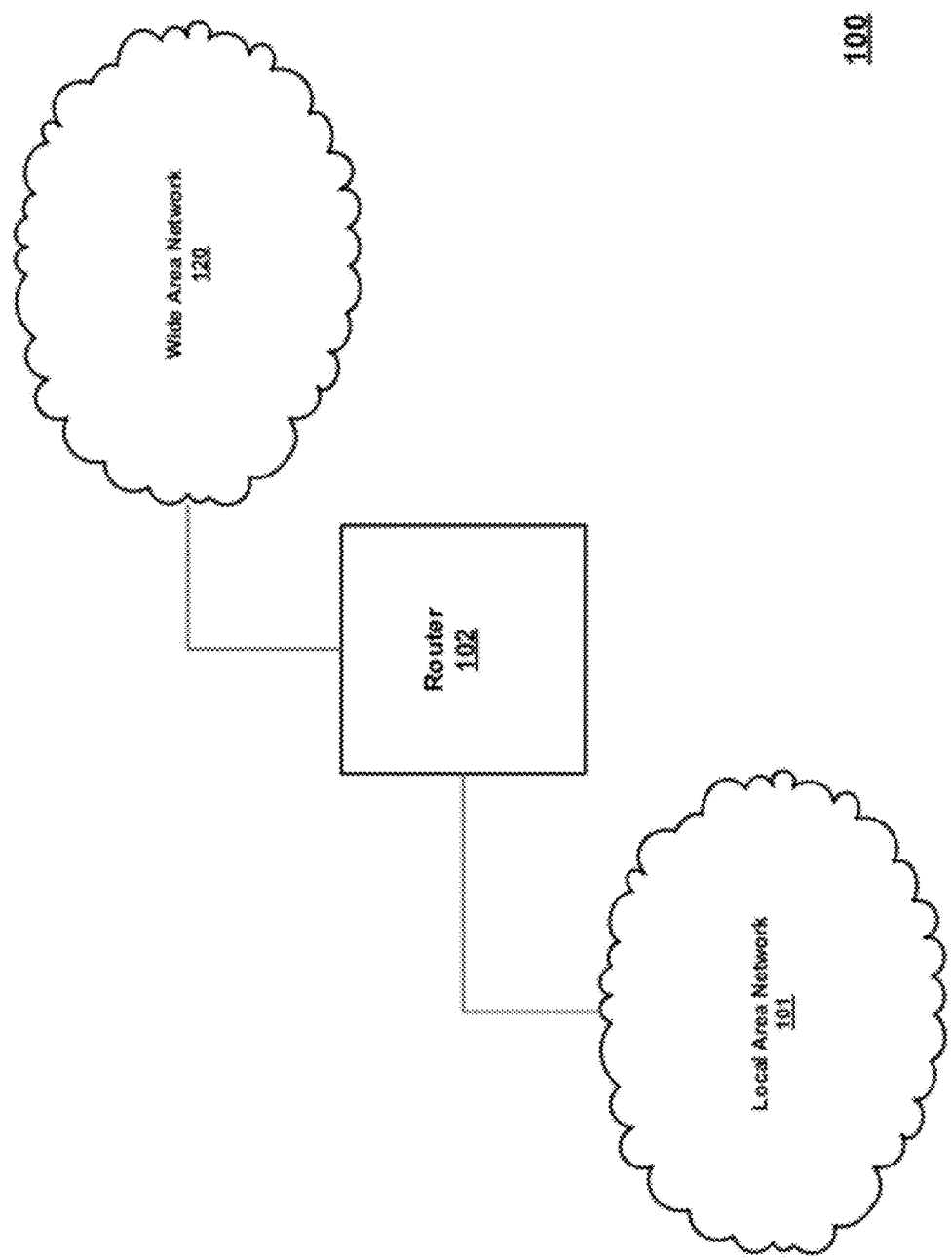
FIG. 1 is a block diagram of a communication network in accordance with one embodiment of the present disclosure.

FIG. 1 illustrates a communication network 100 in accordance with one embodiment of the present disclosure. The communication network 100 includes a local area network (LAN) 101, a router 102, and a wide area network (WAN) 120. As used herein, a LAN refers to a computer network that connects computers and devices in a limited geographical area such as home, school, computer laboratory or office building. A WAN refers to a computer network that covers a broad area and crosses metropolitan, regional, or national boundaries. Accordingly, the LAN 101 and WAN 120 each includes servers, routers, and other computer devices configured to communicate via the communication network 100. Routers and other switching devices form the communication backbones for the LAN 101 and the WAN 120 by routing received packets to other network nodes according to address information included in each packet. Each point in the network that can receive data from or send data to the network for communication is referred to as a network node. Accordingly, each network node can include one or more routers, servers, computer devices, and the like, or any combination thereof. A network node that originates data for communication, or is the target destination for the data, is referred to as an endpoint with respect to that data.

The router 102 is a router device configured to receive data from both the LAN 101 and the WAN 120 and communicate the data to other network nodes, including nodes in the LAN 101 and network nodes in the WAN 120. Data received from network nodes of the LAN 101 is referred to for purposes of discussion as LAN-side traffic, while data received from network nodes of the WAN is referred to as WAN-side traffic. Router 102 is located geographically close to the nodes of the LAN 101. For example, router 102 can be located in the same building, such as a house or office building, as the network nodes of the LAN 101. Accordingly, LAN-side traffic for the router 102 typically has smaller latency than WAN-side traffic. That is LAN-side traffic typically takes less time to reach the router 102 than WAN-side traffic.

The router 102 can take advantage of the relatively small latency for LAN-side traffic by processing the LAN-side traffic differently than the WAN-side traffic. For example, the LAN-side traffic can be provided in a rudimentary packetized data stream that is not suitable for routing via the WAN 120. The router 102 can process the LAN-side traffic at a locally executed network protocol stack to place the LAN-side traffic in a format suitable for communication via WAN 120, and route the processed traffic normally. In addition, the router 102 can route WAN-side traffic targeted to nodes of the WAN 120 normally. For WAN-side traffic targeted to a node of the LAN 101, the router 102 can process the traffic via the locally executed network protocol stack to form a data stream that is not suitable for communication via the WAN 120, and provide the data stream to the target network node. Thus, the router 102 can perform network protocol stack functions for the nodes of the LAN 101 that are conventionally performed at the individual nodes. By offloading the network protocol stack functions to the router 102, processing at each node of the LAN 101 is simplified.

Further, offloading of the stack processing functions to the router 102 reduces the number of network hops for packets based on information received from the LAN 101 by at least one hop, thereby reducing network latency. In particular, for some communication protocols, the network protocol stack improves communication reliability by waiting a designated amount of time for the destination of a packet to send an acknowledgement that the packet was received. If an acknowledgement is not received within a designated (either predetermined or programmable) period of time, the network protocol stack retransmits the received packet. Similarly, the network protocol stack can be responsible for sending an acknowledgment to a packet source in response to receiving a packet. In the illustrated embodiment of FIG. 1, the network protocol stack of the router 102 manages both the sending of acknowledgements and the retransmission of packets for data received from the LAN 101. Because the router 102 is closer, in terms of network hops, to the destination, the network protocol stack at the router can receive and send acknowledgements more quickly than a node of the LAN 101, communication latency can be reduced.

In addition, in some embodiments communication reliability can be improved by sending multiple copies of a packet to a destination in the LAN 101, rather than waiting for acknowledgement that a packet was received at its target destination. For packets targeted to a destination in the WAN 120, sending multiple packets from the router 102 may not be feasible or desirable due to the relative latency and bandwidth issues. However, information targeted to a destination in the LAN 101 is communicated from the router 102 more quickly that information is communicated over the WAN 120. Accordingly, in response to determining at the network protocol stack at the router 102 that a packet is targeted to a node of the LAN 101, the router 102 can send multiple copies of each packet to the destination node. This can reduce or obviate the need to wait for acknowledgments from the destination node, thereby reducing communication latency. The network stack at the router 102 can comply with one or more communication protocols, such as TCP/IP, UDP, and the like.

In another embodiment, the router 102 can provide different quality of service or other processing functions for LAN-side traffic than for WAN-side traffic. For example, robustness of communication can be improved by sending multiple copies of data to a target destination. However, making multiple copies may not be feasible for high-latency traffic, such as WAN-side traffic. Accordingly, the router 102 can send more copies of data provided via LAN-side traffic than copies of data provided via WAN side traffic. For example, for each packet associated with LAN-side traffic (whether the packet is provided by a node of the LAN 101 or formed by a locally-executed network protocol stack of the router 102), the router 102 can send N copies of the packet to the target network node, where N is an integer. In contrast, for packets associated with WAN-side traffic, the router 102 can send M copes of the packet to the target network node, where M is an integer. In an embodiment, M is less than N.

Figure 2:
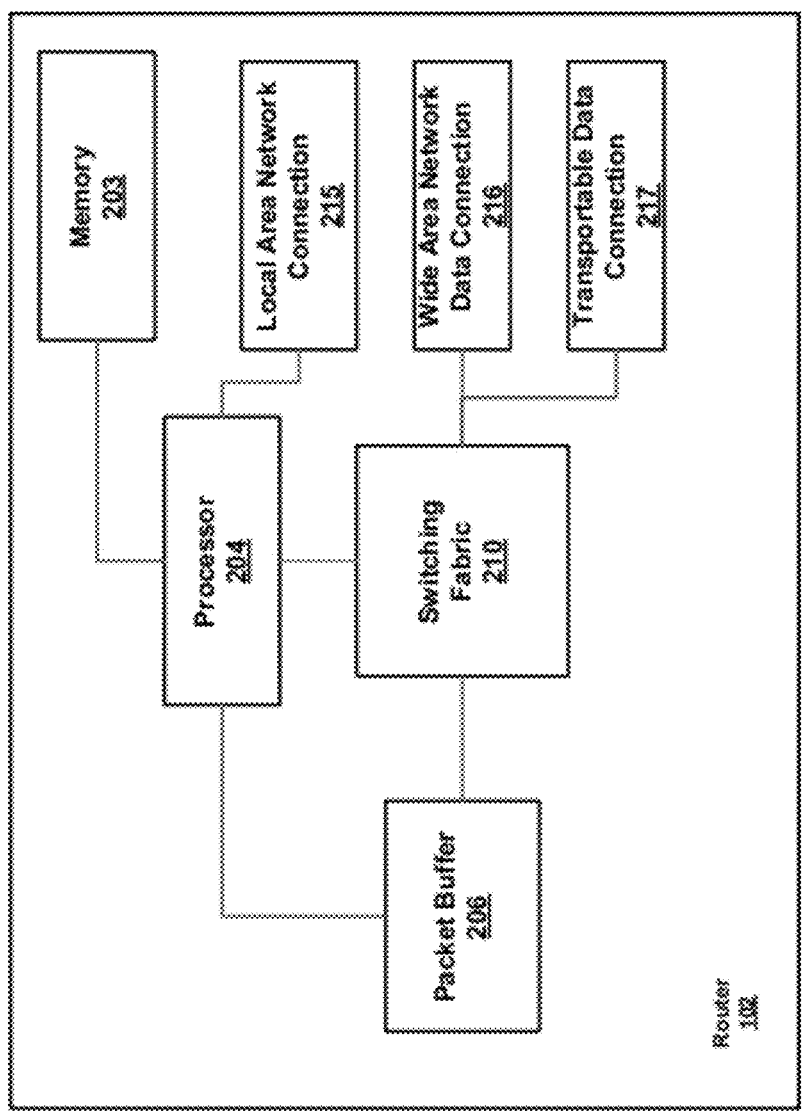
FIG. 2 is a block diagram of a router in accordance with one embodiment of the present disclosure.

Referring to FIG. 2, a block diagram of the router 102 is illustrated in accordance with one embodiment of the present disclosure. Router 102 includes a number of modules to facilitate receiving and routing of both transportable packets and raw data. In particular, in the illustrated example of FIG. 1, router 102 includes processor 204, a packet buffer 206, a switching fabric 210, and data connections 215-217. The data connections include a local area data connection 215 and wide area network data connections 216 and 217. Each of the wide area network connections 216 and 217 is an input/output connection to the network that allows for both receiving packets from and communication of packets to nodes of the wide area network 120. In particular, each of the wide area network data connections 216 and 217 is connected to a different subset of the nodes included in the wide area network 120. Accordingly, by receiving a packet at one network connection and transmitting the packet via another network connection, router 102 communicates the packet from one subset of nodes to another. The local area data connection 215 is connected to the local area network 101 and can transmit or receive raw data that is not suitable for transport via the wide area network 120. For example, the raw data may not include appropriate header information for transport via the network. Further, the raw data may not be organized in a format that allows for communication via the network.

Switching fabric 210 is a communication backbone that routes transportable packets between modules of the router 102. The switching fabric receives control signaling that indicates which module of the router 102 is to receive a provided transportable packet. Accordingly, switching fabric 210 facilitates reception, storage, and provision of transportable packets by the router 102.

Packet buffer 206 is a memory structure, such as a random access memory (RAM), non-volatile memory, or other memory that stores received transportable packets. Packet buffer 206 can store the transportable packets in individually addressable locations, whereby the packet buffer 206 stores or retrieves transportable packets at the addressable locations based on received control signaling. The control signaling indicates whether an access request to the packet buffer 206 is a read or write access, and indicates the address of the location associated with the access. In response, the packet buffer 206 stores a received transportable packet at the indicated location, in the case of a write access, or retrieves a packet stored at the indicated location, in the case of a read access.

Processor 204 is a module operable to control the operations of the router 102. Accordingly, processor 204 can be a general purpose or application specific processor, one or more logic modules to implement a state machine, and the like, or any combination thereof. To control the operations of the router 102, processor 204 monitors packets received at the router 102, and provides control signaling to facilitate storage and routing of the received packets based on address information associated with each packet. Processor 204 can also execute a network protocol stack, to convert between transportable packets and raw data.

To illustrate, during operation a transportable packet is received at one of the wide area network data connections 216 and 217. In response to receiving the packet, processor 204 provides control signaling to the switching fabric 210 to have the packet provided to the packet buffer 206. Processor 204 also provides control signaling to the packet buffer 206 so that the received packet is stored at an address indicated by the processor 204. Processor 204 can also provide control signaling to retrieve a packet from the packet buffer 206, analyze the destination address information included in the packet, and control the switching fabric 210 so that the packet is provided to the one of the wide area network data connections 216 and 217 indicated by the destination address. In particular, the processor 204 can access one or more routing tables (not shown) that indicate destination address ranges associated with each subset of network nodes connected to the router 202. Based on the subset of nodes indicated by the address, the router control module can control the switching fabric 210 to provide the packet to the one of the wide area network data connections 216 and 217 associated with the indicated subset of nodes.

In addition, the processor 104 can receive raw data from the local area network data connection 215 and execute a network protocol stack to convert the raw data into transportable packets. The processor 204 then stores the transportable packets at the packet buffer 206 for communication. In addition, the processor 204 can determine that transportable packets stored at the packet buffer 206 are targeted to a network node of the LAN 101 and, in response, employ the network protocol stack to convert the transportable data packets to raw data. The processor 204 provides the raw data to the local area network data connection 215 for communication to the target network node of the LAN 101.

In addition to conversion of raw data into transportable packets, the network protocol stack executing at the processor 204 can perform other functions, including flow control and other functions associated with a network protocol stack, for the transportable packets formed from data received via the local area network connection 215. For example, the network protocol stack executed at the processor 204 can manage communication reliability functions, such as generating acknowledgments for packets received from the WAN 120 and targeted to the LAN 101, waiting for acknowledgments from a packet destination to determine whether to resend a packet or send another packet to the destination, and the like. Further, the network protocol stack at the processor 204 can, instead of employing acknowledgments for packets targeted to nodes at the LAN 101, send multiple copies of each packet, thereby reducing communication latency Accordingly, the processor 204 performs as a network protocol stack proxy for the computer device connected to the local area network connection 215.

Figure 3:
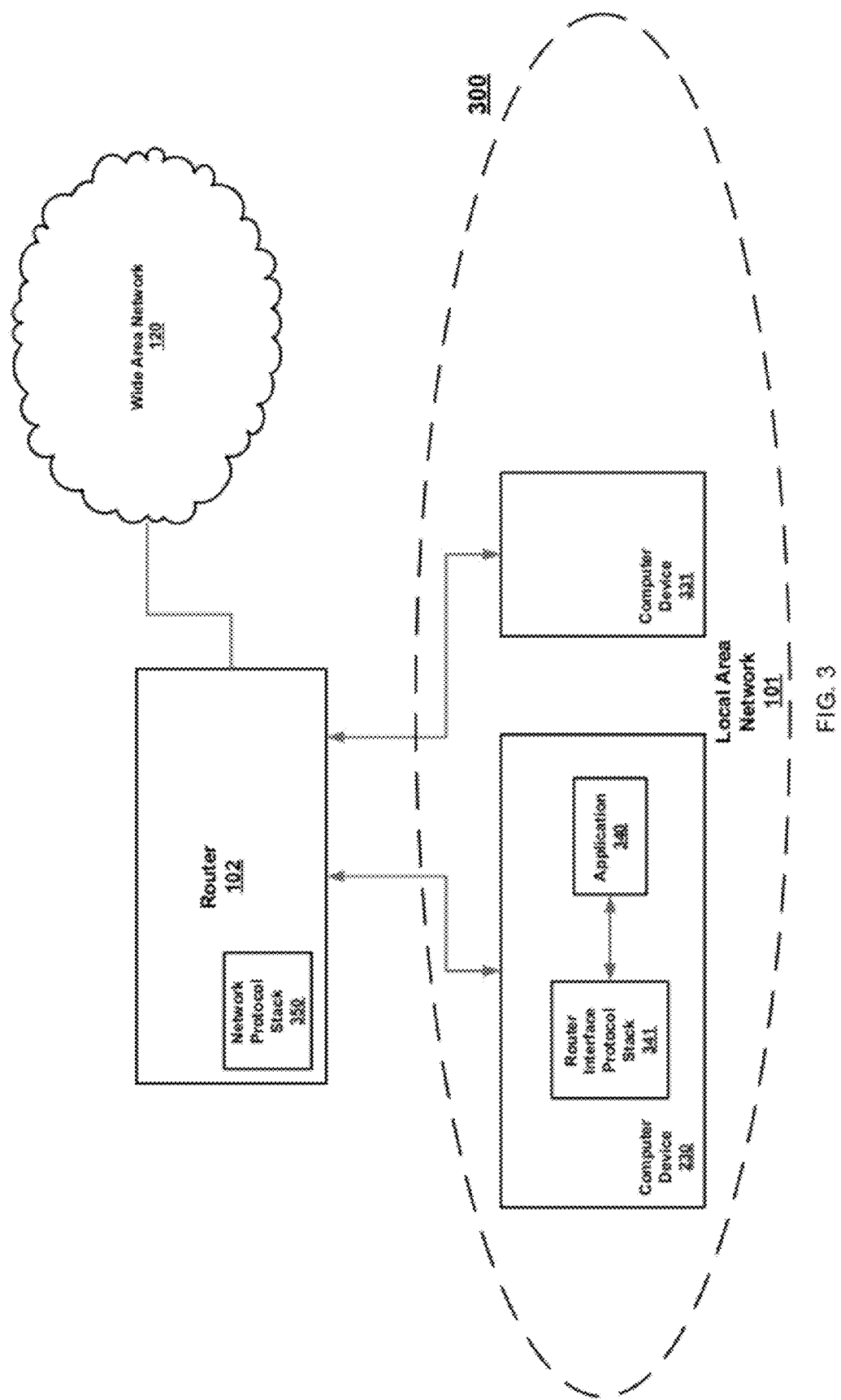
FIG. 3 is a block diagram of a communication system in accordance with one embodiment of the present disclosure.

FIG. 3 illustrates a communication system 300 incorporating the router 102 of FIG. 1 in accordance with one embodiment of the present disclosure. The communication system 300 also includes the WAN 120 and the LAN 101. The LAN 101 includes computer devices 330 and 331, each connected to the router 102. Each of the computer devices 330 and 331 executes applications. For example, computer device 330 executes application 340.

In the illustrated embodiment, it is assumed that the computer devices 330 and 331 are each connected to the LAN 101 of the router 102, while the WAN 120 is connected to the WAN connections 216 and 217. Computer device 330 executes a router interface protocol stack 341 that receives raw data from application 340, processes the received raw data into a format that can be communicated via the connection to the router 102, and communicates the converted raw data to the router 102. The router interface protocol stack 341 does not convert the received data into transportable packets. Accordingly, processor 204 at the router 102 executes a network protocol stack 350 that converts the raw data provided by the router interface protocol stack to transportable data packets. In addition, the network protocol stack 350 converts transportable packets targeted to the computer device 330 into raw data, and provides the raw data to the router interface protocol stack 341. In response, the router interface protocol stack 341 converts the received data to a format that can be processed by application 340. In an embodiment, the router interface protocol stack is executed by a network interface device, such as a network interface card (NIC) of the computer device 330.

In addition, network protocol stack 350 performs flow control and other network protocol stack functions on behalf of the computer device 330. This reduces the processing load at the computer device 330, thereby reducing network lag and other communication problems.

Figure 4:
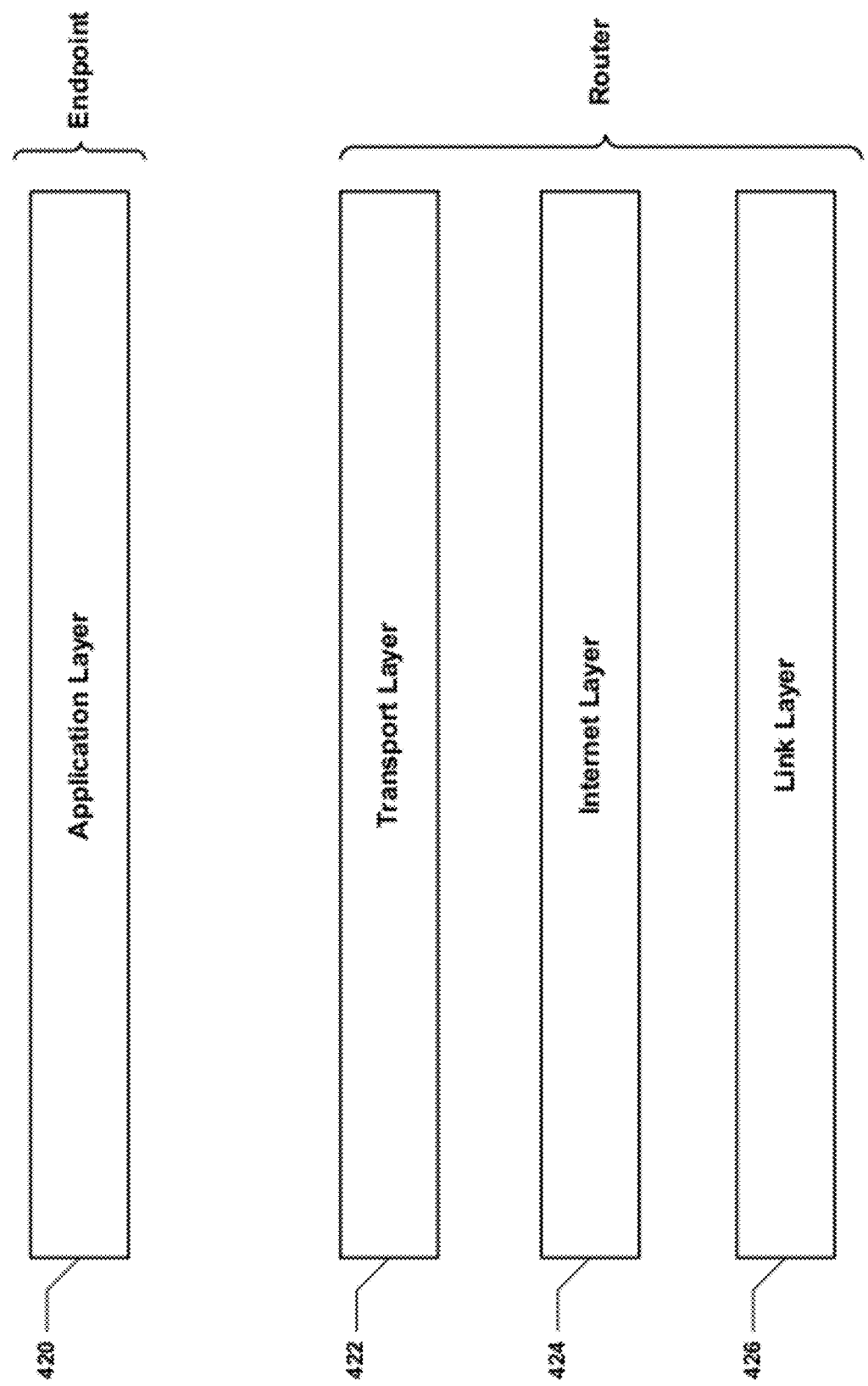
FIG. 4 is a block diagram of a network protocol stack in accordance with one embodiment of the present disclosure.

FIG. 4 illustrates a network protocol stack 400 in accordance with one embodiment of the present disclosure. The network protocol stack 400 includes a transport layer 422, an Internet layer 424, and a link layer 426, each of which perform associated functions for the network protocol stack 400. In particular, the network protocol stack 400 communicates information with applications executing at an application layer 420. In the illustrated embodiment, the application layer 420 is executed at an endpoint, such as computer device 330 of FIG. 3. Transport layer 422, Internet layer 424, and link layer 426 are each executed at the processor 204 of router 102, thereby offloading these functions from the endpoint.

Figure 5:
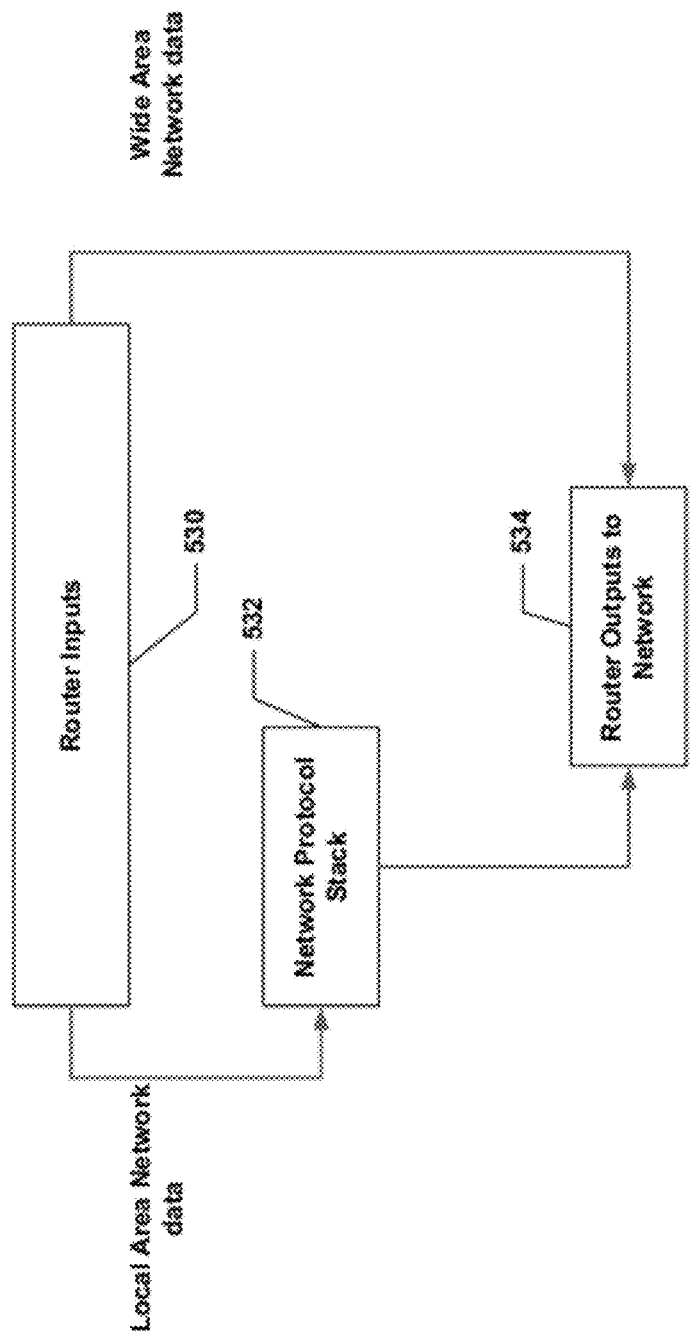
FIG. 5 is a flow diagram illustrating operation of the router of FIG. 1 in accordance with one embodiment of the present disclosure.

FIG. 5 illustrates a flow diagram illustrating operation of the router 102 in accordance with one embodiment of the present disclosure. At block 530, information is received at the data connections 215-217. If the information is received at one of the WAN connections 216 and 217, the information is transportable packets, and the router 102 routes the transportable packets to the target network node at block 534. If the information is received at the LAN connection 215, the router 102 provides the received raw data to the network protocol stack at block 532. The network protocol stack 532 converts the received raw data into transportable packets and routes the transportable packets to the target network node at block 534.

Figure 6:
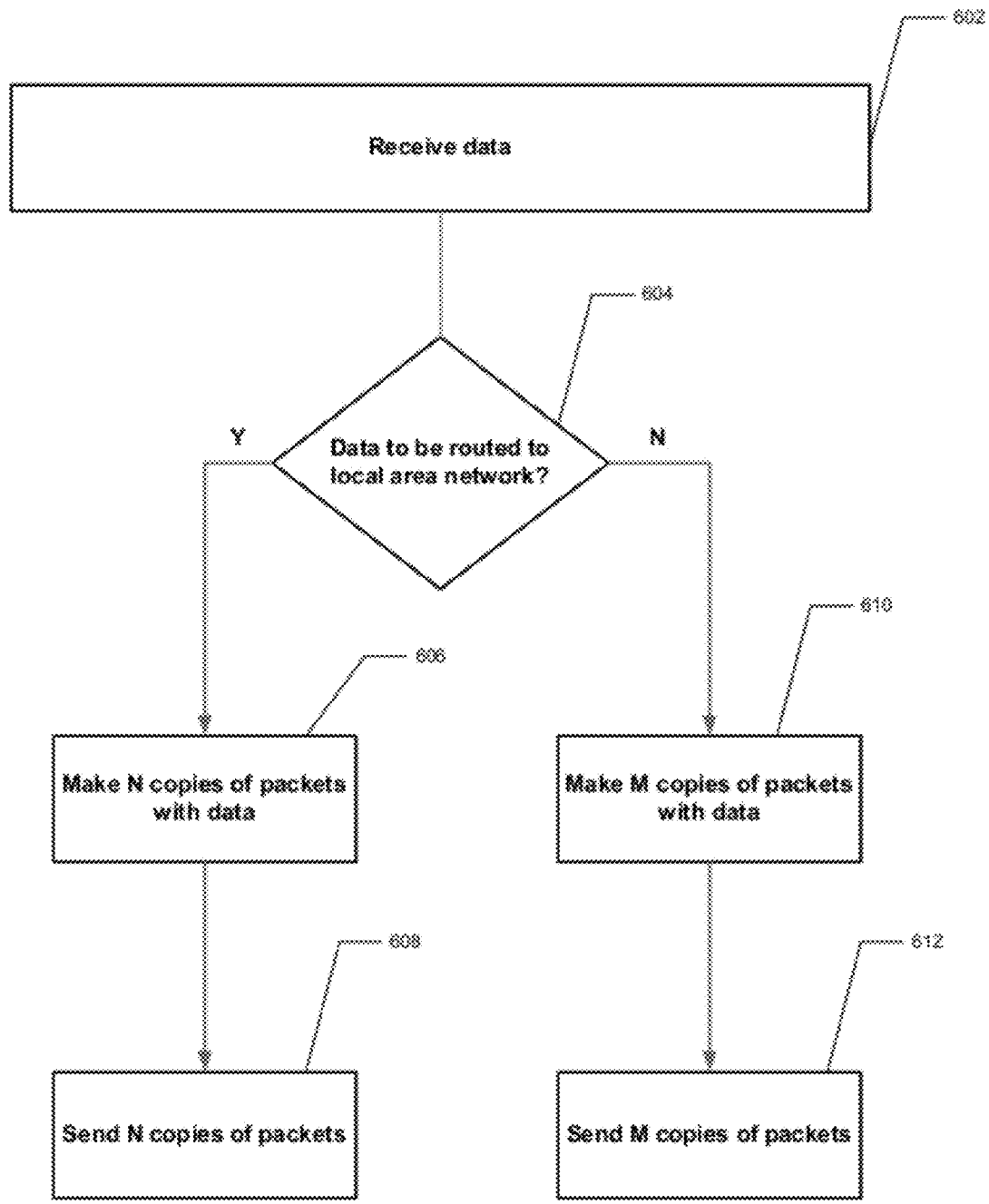
FIG. 6 is a flow diagram of a method of managing communications at the router of FIG. 1 in accordance with one embodiment of the present disclosure.

FIG. 6 illustrates a flow diagram of a method of managing communications at the router 102 in accordance with one embodiment of the present disclosure. At block 602 the router receives data to be communicated from one of the data connections 215-217. At block 604, the router 102 determines if the data is received targeted to a node of the LAN 101 or a node of the WAN 120. This determination can be made, for example, based on the particular data connection via which the data is received. If the data is targeted to a node of the LAN 101, the router 102 processes the data at the locally executed network protocol stack to form packets and at block 606 makes N copies of each packet for communication, where N is an integer. At block 608 the router 102 sends the N copies of each packet to the target network node of the WAN 120 or the LAN 101. If, at block 604, the router 102 determines that the received data is targeted to a node of the WAN 120, the method flow proceeds to block 610 and the router 102 makes M copies of each received packet, where M is an integer different from N. At block 612, the router 102 routes the M copies to the target network node. In an embodiment, M is equal to one, and the router 102 does not make copies of the received packets, but rather routes each packet to the target node without making copies.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for offloading network protocol stack processing from a source node of a local area network (LAN) to a router coupled to the LAN, the method comprising:
   receiving, at a first input of the router, first data from the source node, the first data in a first format that includes first layer data for a first layer providing a function of an application layer and does not include second layer data for a second layer providing a function of a transport layer;
   processing the first data at a network protocol stack of the router to determine second data in a second format, the second format suitable for communication to a wide area network (WAN) coupled to the router; and
   transmitting the second data to the WAN.

2. The method of claim 1, further comprising:
   receiving, at a second input of the router, third data from the WAN, the third data in the second format;
   processing the third data at the network protocol stack to determine fourth data in the first format; and
   transmitting the fourth data from the router to the source node.

3. The method of claim 1, further comprising:
   in response to receiving at the router a packet from the WAN, generating at the network protocol stack an acknowledgement; and
   transmitting the acknowledgement to the WAN.

4. The method of claim 1, further comprising:
   retransmitting the second data in response to determining at the network protocol stack that an acknowledgment of receipt of the second data has not been received in a first amount of time from the transmitting the second data to the WAN.

5. The method of claim 1, further comprising:
   forming a packet based, at least in part, on the first data; and
   transmitting a plurality of copies of the packet from the router to the WAN.

6. The method of claim 1, wherein the network protocol stack comprises a TCP/IP stack.

7. The method of claim 1, wherein the network protocol stack comprises a UDP stack.

8. A method for network protocol stack processing at a router, the method comprising:
   receiving a first data from a source node, the first data in a first format that includes first layer data for a first layer and does not include second layer data for a second layer, wherein the first layer provides a function of an application layer and the second layer provides a function of a transport layer;
   determining, a target node for the first data;
   processing the first data at a network protocol stack of the router to a second format, the second format suitable for communication to the target node;
   determining, whether the target node is a node of a local area network (LAN) or a node of a wide area network (WAN);
   in response to determining the target node is the node of the LAN, transmitting first number of copies of the first data to the LAN for routing to the target node, wherein the first number of copies are transmitted to the target node of the LAN without waiting for acknowledgement from the target node that at least one of the first number of copies has been received by the target node; and
   in response to determining the target node is the node of the WAN, transmitting a second number of copies of the first data to the WAN for routing to the target node, wherein the first number is greater than the second number.

9. The method of claim 8, further comprising:
   receiving, second data from the WAN, the second data in the second format; and
   routing the second data from the router to the WAN.

10. The method of claim 8, further comprising:
    in response to receiving at the router a packet from the WAN, generating at the network protocol stack an acknowledgement; and
    communicating the acknowledgement to the WAN.

11. The method of claim 8, further comprising:
    retransmitting the first data in response to determining at the network protocol stack that an acknowledgment of receipt of the first data has not been received.

12. The method of claim 8, wherein the network protocol stack comprises a TCP/IP stack.

13. The method of claim 8, wherein the network protocol stack comprises a UDP stack.

14. A router comprising:
    a first input configured to be coupled to a local area network (LAN); and
    a processor configured to offload network protocol stack processing from a source node of the LAN, wherein the processor is further configured to:
       receive, at the first input of the router, first data from the source node, the first data in a first format that includes first layer data for a first layer providing a function of an application layer and does not include second layer data for a second layer providing a function of a transport layer;
       process the first data at a network protocol stack of the router to determine second data in a second format, the second format suitable for communication to a wide area network (WAN) coupled to the router; and
       transmit the second data to the WAN.

15. The router of claim 14, wherein the processor is further configured to:
    receive, at a second input of the router, third data from the WAN, the third data in the second format;
    process the third data at the network protocol stack to determine fourth data in the first format; and
    transmit the fourth data from the router to the source node.

16. The router of claim 14, wherein the processor is further configured to:
    in response to receipt at the router of a packet from the WAN, generate at the network protocol stack an acknowledgement; and
    transmit the acknowledgement to the WAN.

17. The router of claim 14, wherein the processor is further configured to:
    retransmit the second data in response to determining at the network protocol stack that an acknowledgment of receipt of the second data has not been received in a first amount of time from transmission of the second data to the WAN.

18. A non-transitory computer-readable medium having computer executable instructions that, when executed, cause a processor to perform operations comprising:
    offloading network protocol stack processing from a source node of a local area network (LAN) to a router coupled to the LAN, wherein offloading network protocol stack processing includes:
       receiving at a first input of a router first data from the source node, the first data in a first format that includes first layer data for a first layer providing a function of an application layer and does not include second layer data for a second layer providing a function of a transport layer;

processing the first data at a network protocol stack of the router to determine second data in a second format, the second format suitable for communication to a wide area network (WAN) coupled to the router; and transmitting the second data to the WAN.

19. The non-transitory computer-readable medium of claim 18, wherein the operations further comprise:

receiving, at a second input of the router, third data from the WAN, the third data in the second format;

processing the third data at the network protocol stack to determine fourth data in the first format; and transmitting the fourth data from the router to the source node.

20. The non-transitory computer-readable medium of claim 18, wherein the operations further comprise:

in response to receiving at the router a packet from the WAN, generating at the network protocol stack an acknowledgement; and transmitting the acknowledgement to the WAN.

21. The non-transitory computer-readable medium of claim 18, wherein the operations further comprise:

retransmitting the second data in response to determining at the network protocol stack that an acknowledgment of receipt of the second data has not been received in a first amount of time from transmitting the second data to the WAN.

22. The non-transitory computer-readable medium of claim 18, wherein the operations further comprise:

forming a packet based, at least in part, on the first data; and transmitting a plurality of copies of the packet from the router to the WAN.

\* \* \* \* \*